United States Patent [19]

Nemoto et al.

[11] 4,134,659

[45] Jan. 16, 1979

[54] CAMERA SHUTTER CONTROL MEANS

[75] Inventors: Ichiro Nemoto; Tadashi Nakagawa; Mitsuo Koyama, all of Yotsukaido, Japan

[73] Assignee: Seiko Koki Kabushiki Kaisha, Japan

[21] Appl. No.: 787,204

[22] Filed: Apr. 13, 1977

[30] Foreign Application Priority Data

Apr. 14, 1976 [JP] Japan .......................... 51-47264[U]

[51] Int. Cl.² ............................................. G03B 17/38
[52] U.S. Cl. .................................................. 354/267
[58] Field of Search ............... 354/267, 266, 241, 242, 354/243, 244

[56] References Cited

U.S. PATENT DOCUMENTS 4,044,368   8/1977   Inoue ................................... 354/267

Primary Examiner—Michael L. Gellner
Attorney, Agent, or Firm—Robert E. Burns; Emmanuel J. Lobato; Bruce L. Adams

[57] ABSTRACT

A camera shutter control mechanism for controlling a shutter opening comprises an opening member movable in an opening direction for opening the shutter opening to start an exposure and a closing member movable in a closing direction for closing the shutter opening to terminate the exposure. Opening and closing pawls releasably lock the opening and closing members in their charged positions. An operating member actuates the opening pawl so as to release the opening member for movement in the opening direction and during the course of such movement, the opening member actuates an interlock lever which in turn actuates an adjustable fulcrum lever for actuating the closing pawl to release the closing member for movement in the closing direction. An exposure period setting member is arranged so as to adjust the operation of the fulcrum lever with respect to the closing pawl and for selectively effecting movement of the fulcrum lever to operative and inoperative positions. A control lever operates the closing pawl in the event the fulcrum lever is adjusted to a position in which it is unable to do so. The control lever is releasably locked in a charged position by an engagement pawl which releases locking engagement with the control lever upon movement of the opening member in the opening direction.

7 Claims, 6 Drawing Figures

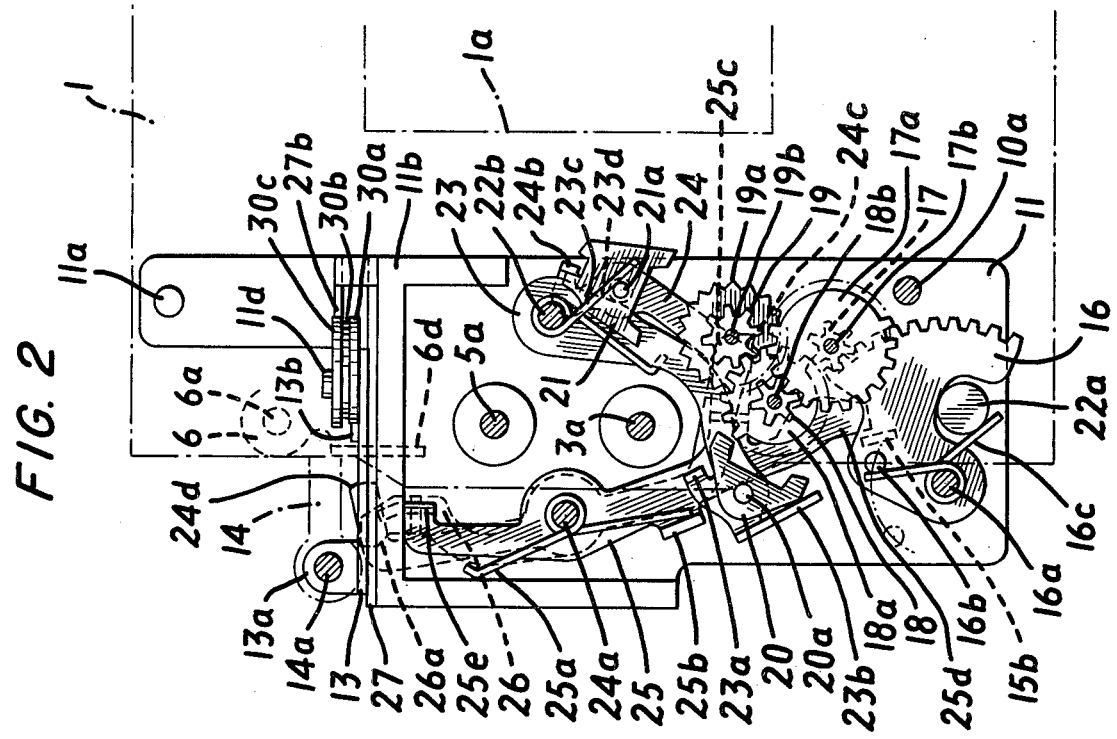
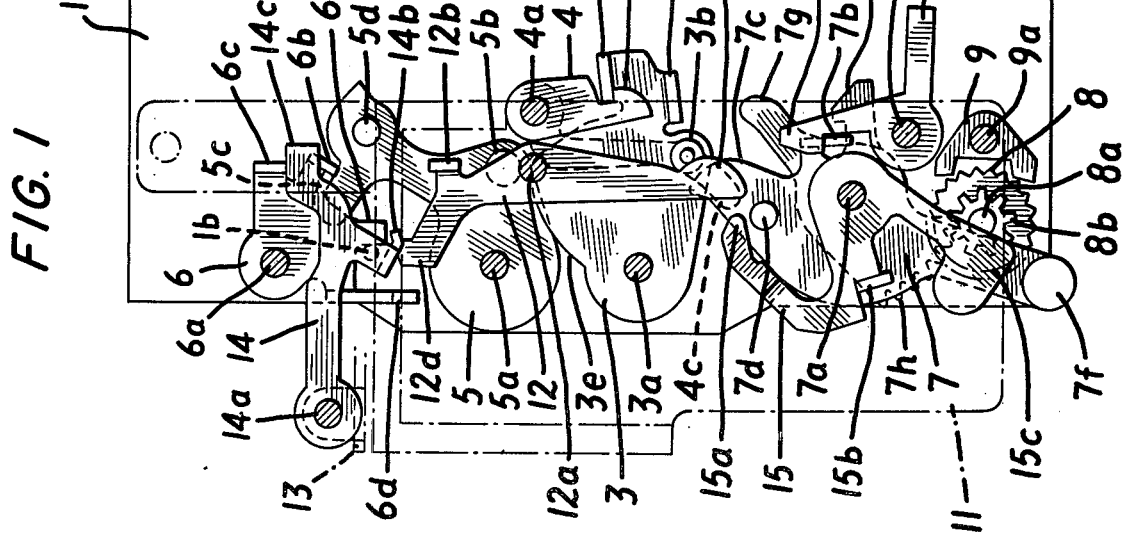

CAMERA SHUTTER CONTROL MEANS

BACKGROUND OF THE INVENTION

This invention relates to camera shutter control means. Heretofore, there have been known various methods of causing a delay of a shutter aperture closing member by operating a mechanical delay means for controlling the camera shutter exposure period, and they are roughly classed into two types, namely one in which the exposure is started when an operating member is released by shutter release to release an opening member and is ended when a closing member is operated after a delay time provided by a mechanical delaying means, and one in which the exposure period is desirably controlled with opening and closing members adapted to be released without any time relation to each other and with mechanical delaying means having direct effect upon the sole closing member.

The first-mentioned method has a drawback in that the operating stroke of the operating member tends to be large so that the set angle of the shutter tends to be large. Also, since the opening and closing members are released in succession by the operating member, in order to control the exposure period to the shortest period (for instance 1/2,000 second), the opening and closing members have to be released in succession with only a very slight time difference involved. Therefore, steady control cannot be obtained unless the precision of the component parts is sufficiently improved; in extreme cases inversion of their phases is likely to result.

In the second-mentioned method, a greater stroke is required for the closing member. While it is often used for shutters of the type being wound on a drum such as cloth screen focal plane shutters, with increase of the stroke the size of the shutter is usually increased as well and such an increase in size is disadvantageous.

Where gear trains are used as the mechanical delaying means for controlling the exposure period of the camera, the end of accurately controlling the exposure period over a wide range is achieved by arranging such as to vary the resistance ratio in the gear train by such means as an ankle detachably provided in mesh with the gear train or a part thereof.

A switching means for causing engagement or disengagement of part of the gear train or the ankle is constructed such that engagement and disengagement is directly effected by operating a shutter dial. However, where the switching means is reduced in size in accordance with size reduction of the camera, it is extremely difficult to effect the engagement and disengagement directly with the switching means unless the stroke of the member for engagement and disengagement is reduced.

SUMMARY OF THE INVENTION

One object of the invention is to improve the above drawbacks and provide a shutter of a reduced size, more particularly an exposure period control means for a shutter including a first control system with which an opening member is driven by an operating member adapted to be released by shutter release and a closing member is released by the opening member during movement thereof, and a second control system with which a control member is released during movement of the opening member and the closing member is subsequently released after the control member is delayed by a mechanical delaying means, said first and second control systems being capable of being selectably switched over to each other.

Another object of the invention is to provide a switching means in the afore-said second control system, in which the engagement and disengagement member for the engagement and disengagement actions is reduced in size without reducing the stroke.

A restraining lever having a small stroke is displaced by an exposure period converting member (such as a cam) which is adapted to be operated in an interlocked relation to a shutter dial, so that a switching member for displacing part of the gear train or the ankle to an inoperative position separated from an engagement position by shutter charge is brought to a region of action of the restraining lever, and the restraining lever is selectively caused by the exposure period converting member to restrain or release the switching member, whereby the gear train part or the ankle is switched between the operative position and inoperative position.

BRIEF EXPLANATION OF THE DRAWING

The drawing illustrates one embodiment of the invention, in which:

FIG. 1 is a plan view of the shutter in the charged state;

FIG. 2 is a plan view showing a control section disposed on the mechanism of FIG. 1 and in the charged state;

DETAILED DESCRIPTION OF THE PREFERRED EMBODIMENTS

Figure 3:
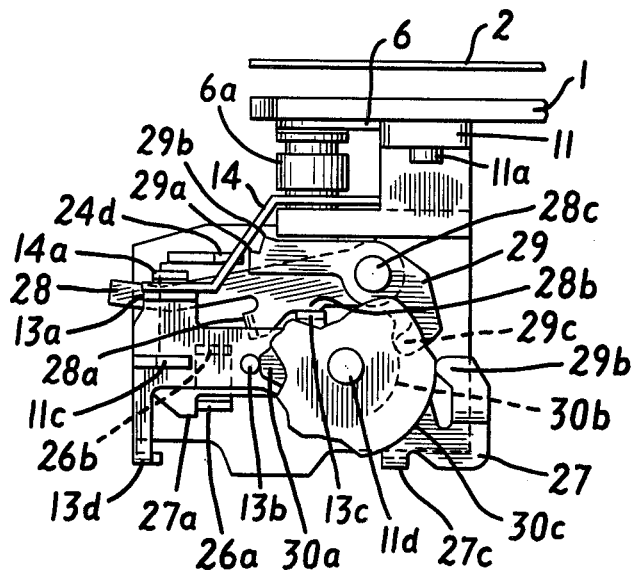
FIG. 3 is an upper side view of the shutter of FIGS. 1 and 2 in a state in which the exposure period is set to the shortest period.

Referring to FIG. 1, a shutter base plate 1 is formed with a shutter opening 1a for effecting an exposure and is covered with opening blade means not shown. Also, closing blade means (not shown) is accommodated at an upper edge portion of the opening 1a and ready for ending the exposure. Each of the blade means is supported such that it can operate within a plane parallel to a plate member 2 of the same shape as the shutter base plate 1 and extending parallel thereto.

An opening member 3 is pivoted by a shaft 3a to the base plate 1, and biased for clockwise rotation in an opening direction by a spring (not shown). The opening member 3 is provided on its right side portion with a two-stage protuberance 3b for charging, upwardly projecting bent portions 3c and 3d, a cam portion 3e formed on an upper outer periphery and a lower protuberance (not shown) operably coupled to the opening blade means, with the bent portion 3d engaged with a hook 4b of an opening pawl 4.

The opening pawl 4 is mounted by a shaft 4a on the base plate 1 and is rotatably supported with counter-clockwise bias torque provided by a spring (not shown). Further, the opening pawl 4 is integral with a downwardly extending arm 4c.

A closing member 5 is rotatably mounted by a shaft 5a on the base plate 1 and is biased for clockwise rotation in a closing direction by a spring (not shown). The closing member 5 is provided on its right side portion with an upper protuberance 5b for charging, a hook 5c and a lower protuberance 5d operably coupled to the closing blade means, with the hook 5c in engagement with a bent portion 6b of the closing pawl 6.

The closing pawl 6 is mounted by a shaft 6a on the base plate 1 and is rotatably supported with counterclockwise torque provided by a spring (not shown). It is provided with two, upwardly projecting bent portions 6c and 6d and a convex portion for 6e engaging a projection 1b projecting from the base plate 1.

An operating member 7 is pivoted by a shaft 7a to the base plate 1 and is biased for counterclockwise rotation by a spring (not shown). The operating member 7 is provided with an upwardly projecting engagement bent portion 7b, a cam portion 7c engaging with the two-stage protuberance 3b of the opening member 3, a hook 7e engaging with the bent portion 3c of the opening member 3, a protuberance 7f for charging and engaging with a winding member of the camera and protuberance 7g and gear portion 7h formed under and integral with it.

The gear portion 7h is in mesh with a small gear 8b in a zigzag wheel 8, which is pivoted by a shaft 8a to the base plate 1, and the rotation of which is controlled by an ankle 9 similarly pivoted to the base plate 1. The ankle 9 is pivoted by a shaft 9a to the base plate 1.

A release lever 10 is pivoted by a shaft 10a to the base plate 1 and biased for counterclockwise rotation by a spring (not shown). It is provided at its tip with a hook 10b in engagement with the bent portion 7b of the operating member 7.

A control base plate 11 made of a synthetic resin or the like is provided so as to cover the afore-mentioned individual members as indicated by the broken line and is mounted on the base plate 1 by means of a screw 11a and a well-known method not shown. The control base plate 11 is formed with an escapement portion, which is penetrated by the shafts 3a, 5a, 7a and 10a and also by the two-stage protuberance 3b and pin 7d, and is also formed with an upper channel-shaped protuberance 11b.

An interlock lever 12 is pivoted by a shaft 12a to the back side of the control base plate 11, with its bent portion 12b acted upon by a spring (not shown) for clockwise rotation. It is also provided with a cam arm 12c projecting into an operating region of the two-stage protuberance 3b of the opening member 3 and also with an operating protuberance 12d formed at the other end.

An adjustment lever 13 is slidably supported on the channel-shaped protuberance 11b of the control base plate 11 for movement in the transversal directions in a plane normal to the base plate 1 and the lever 13 is biased in the rightward direction by a spring (not shown).

A fulcrum lever 14 is pivoted by a shaft 14a to the adjustment lever 13 and is provided with a bent portion 14b for engaging with the operating protuberance 12b of the interlock lever 12 and an arm 14c for engaging with the bent portion 6c of the closing pawl 6.

An engagement pawl 15 is inserted into a portion where the shaft 7a of the operating member 7 penetrates and projects from the control base plate 11, and it is rotatably supported with counterclockwise bias provided by a spring (not shown). It is provided with an arm 15a for engaging with the two-stage protuberance 3b of the opening member 3, an engagement bent portion 15b and a contact arm 15c extending to the other end.

FIG. 2 shows a control mechanism arranged on top of the individual camera parts in the charged state in FIG. 1 in correspondence to the charged state.

A delaying means consisting of a gear train for controlling the exposure period comprises a sector-shaped first wheel 16, a small gear 17 in mesh therewith, a gear 17a integral with the small gear 17, a small gear 18 in mesh with the gear 17a, a gear 18a integral with the small gear 18, a small gear 19 in mesh with the gear 18a, a zigzag gear 19a integral with the small gear 19, a first ankle 20 in mesh with the gear 18a and a second ankle 21 in mesh with the zigzag gear 19a, and the individual gears are rotatably supported between two plates (not shown) supported by pillars 22a and 22b.

The first wheel 16 is supported by a shaft 16a and has a vertically projecting pin 16b and is urged by a clockwise rotation spring 16c to be in forced contact with the pillar 22a. The gears 17, 18 and 19 are supported by respective shafts 17b, 18b and 19b.

The first ankle 20 is rotatably mounted by a shaft 20a on an ankle lift lever 23, which is rotatably supported by the pillar 22b, and its operating region is restricted by bent portions 23a and 23b of the ankle lift lever 23.

The second ankle 21 is rotatably supported by a shaft 21a on a switching member 24.

Figure 4:
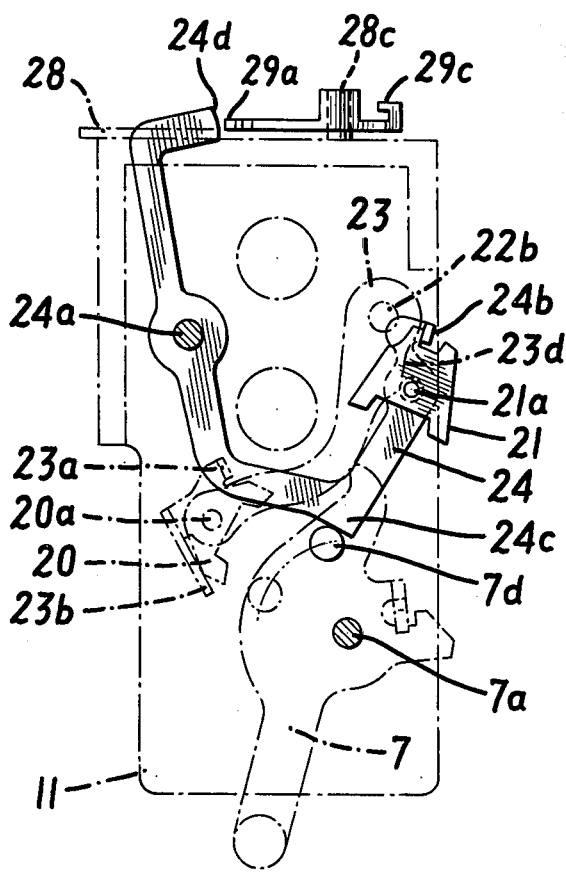
Figure 5:
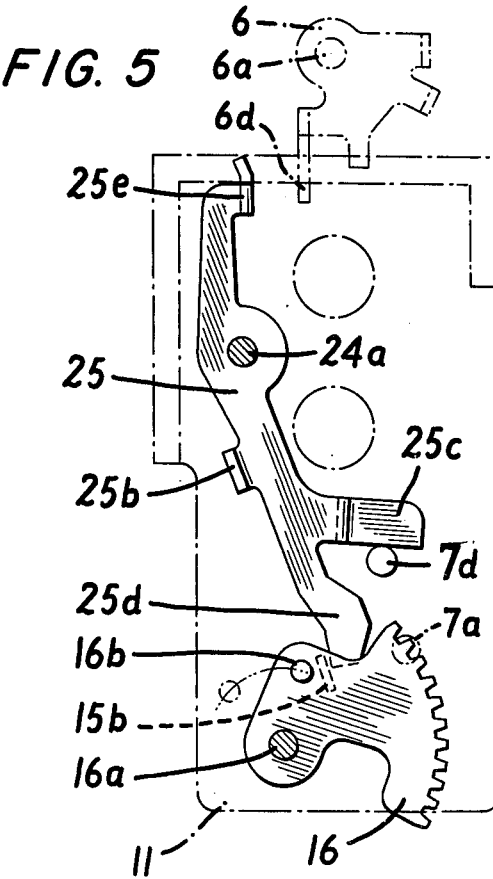

The switching member 24 is rotatably supported by a shaft 24a on the control base plate 1 and is provided with a bent portion 24b for restricting the operating region of the second ankle, an urging portion 24c for engaging with the pin 7d of the operating member 7 (see FIG. 4) and an engagement arm 24d. The shaft 21a is acted upon a spring 23c acting between it and the ankle lift lever 23 so that the ankle 21 is forced to urge the switching member 24 in the direction for meshing with the zigzag gear 19.

The shaft 21a has its lower stem portion in engagement with a cam portion 23d of the ankle lift lever 23, and the cam portion 23d is formed such that with the pin 7a in the shutter charge position, the first and second ankles 20 and 21 are held raised by the switching member 24 in their respective inoperative positions out of mesh with the associated gear 18a and zigzag gear 19a but with movement of the pin 7a caused in an interlocked relation to the operation of the shutter, the first ankle 20 is displaced to an operative position meshing with the gear 18a and then the second ankle 21 is displaced to an operative position meshing with the zigzag gear 19a.

A control lever 25 is fitted on a shaft 24a and is biased for clockwise rotation by a spring 25a acting upon its bent portion 25b. It is provided with a bent portion 25c for engaging with the pin 7d of the operating member 7, an operating arm 25d for engaging with a downwardly extending portion of the pin 16d extending from the first gear 16 and for engaging with the bent portion 15b of the engagement pawl 15, and a lower bent portion 25e for engaging with the bent portion 6d of the closing pawl 6.

Figure 6:
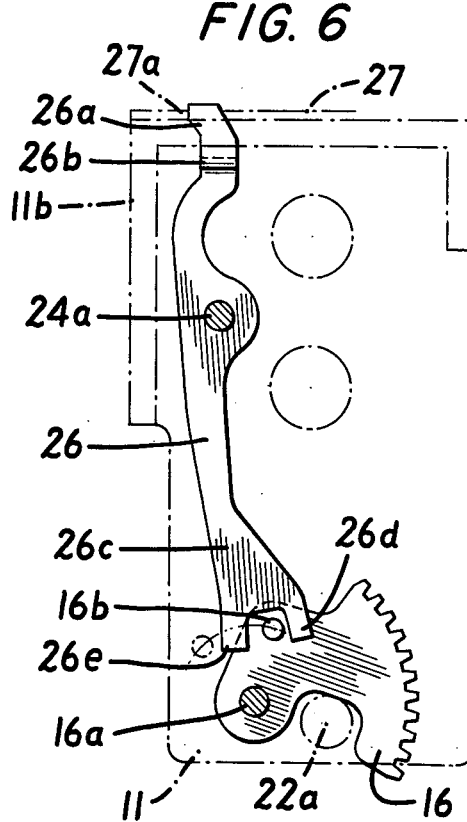
FIGS. 4, 5 and 6 are fragmentary views showing respective parts in the state of FIG. 2.

An operating lever 26 is fitted on a further upper portion of the shaft 24a. While the operating arm 26a is shown only by a broken line in FIG. 2, its detailed form is shown in FIG. 6. The operating lever 26 has a bent portion 26b formed in an end part of the operating arm 26a, and the tip of the other arm 26c is bifurcated into protuberances 26d and 26e for engaging the upper protuberance of the pin 16b of the first gear 16.

On top of the channel-shaped protuberance of the control base plate 1 are supported individual parts interlocked to a switching dial of the camera for switching the exposure period, and they will now be described with reference to FIGS. 2 and 3.

A converting lever 27 for engaging with the operating arm 26a of the operating lever 26 is supported by the protuberance 11c of the control base plate 11 and shaft 11d thereof and is movable in the transversal directions in the Figure, and it is provided with a protuberance 27a for engaging with the operating arm 26a, a two-stage bent portion 27b and a bent portion 27c serving as spring hook.

The adjustment lever 13 is supported by the protuberance 11c and shaft 11d in an overlapping relation to the converting lever 27 and is movable in the transversal directions in the Figure and is provided with a bent portion 13a supporting the fulcrum lever 14, an upward protuberance 13a, a downward bent portion 13 and a bent portion 13d serving as a spring hook.

A spring (not shown) is provided between the aforementioned spring hook bent portions 27e and 13b and biases the converting lever 27 in the left hand direction and the adjustment lever 13 in the right hand direction.

A bulb lever 28 projects into an operating region of a release button of the camera and is provided with a lower bent portion 28a for engaging with the bent portion 26b of the operating lever 26 and a stepped portion 28b for engaging with the lower portion of the adjustment lever 13. It is rotatably supported on a shaft 28c and is biased for counterclockwise direction by a spring (not shown). In the illustrated state, the stepped portion 28b is restrained by the bent portion 13c, with the lower bent portion 28a to a position out of engagement with the bent portion 26b of the operating lever 26.

A restraining lever 29 is fitted on a shaft 28c and is provided with two stepped portions 29a and 29b for engaging with the engagement arm 24d of the switching member 24 and an operating arm 29c, and it is biased for clockwise rotation by a spring (not shown).

Three cam plates 30a, 30b and 30c are rotatably supported in a mutually integrated state on the shaft 11d. The cam plate 30a engages the upper protuberance 13b of the adjustment lever 13, the second cam plate 30b engages the operating arm 29c of the restraining lever 29, and the third cam plate 30c engages the convex portion provided in the two-stage bent portion 27b of the converting lever 27.

In the illustrated state, the upper protuberance 13b is urged in the leftward direction by the cam plate 30a, with the adjustment lever 13 supporting the fulcrum lever 14 in the most leftward position so that the bent portion 14b is held at a position closest to the operating protuberance 12d of the interlock lever 12. Also, with the action of a clockwise rotation spring (not shown) the operating arm 29c causes the stepped portion 29a to be displaced to the operating region of the engagement arm 24d of the switching member 24. Further, by the third cam plate 30c the convex portion provided on the two-stage bent portion 27b of the converting lever 27 is urged in the rightward direction to cause extension of the spring stretched between the spring hook bent portions 13d and 27c and also to cause the protuberance 27a to displace the operating arm 26a of the operating lever 26 in the rightward direction in FIG. 3, thus causing clockwise rotation of the operating lever 26 about the shaft 24a from the state of FIG. 6, while at the same time the pin 16b of the first gear 16 is caused by the protuberance 26d to rotate about the shaft 16a in the counterclockwise direction for displacement to a position out of engagement with the operating arm 25d of the control lever 25, as indicated by the broken line.

Now, the manner of operation when the shutter is released from the above state will be described.

When a camera release button (not shown) is depressed, the release lever 10 is rotated counterclockwise about the shaft 10a against the force of a spring (not shown) to release the engagement bent portion 7b having previously been in engagement with the hook 10b.

When the of the engagement bent portion 7b is released, the operating member 7 is rotated by a counterclockwise rotation spring (not shown) to cause the integral gear portion 7h to rotate the small gear 8b in unison with the gear 8, causing oscillation of the ankle 9 in mesh therewith, whereby counterclockwise rotation of the gear portion 7h and for the operating member 7 integral therewith are braked.

With the counterclockwise rotation of the operating member 7, the urging portion 24c of the switching member 24 is released by the upwardly projecting pin 7d, whereupon the switching member 24 is rotated about the shaft 24 in the clockwise direction by the spring 23c. However, since the engagement arm 24d is engaged by the stepped portion 29a of the restraining lever 29, the first and second ankles 20 and 21 are held in their respective states out of engagement with the associated gear 18 and zigzag gear 19a. At the same time, the bent arm 25c of the control lever 25, following the pin 7d, is rotated in the clockwise direction about the shaft 24a by the spring 25a, so that the operating arm 25d is brought into engagement with the engagement bent portion 15b of the engagement pawl 15.

During the last portion of operation of the operating member 7, the protuberance 7g thereof pushes the arm 4c of the opening pawl 4 to cause clockwise rotation thereof about the shaft 4a until the engagement of the bent portion 3d of the opening member 3 with the hook 4b is released. The operating member 7 has its charge protuberance 7f brought into engagement with and stopped by the stem of the shaft 10a with the opening pawl 4 in the position after counterclockwise rotation.

Meanwhile, when the engagement of the bent portion 3d is released, clockwise rotation of the opening member 3 about the shaft 3a is caused by a spring (not shown) to operate shutter blade means (not shown), thus opening the opening 1a to start an exposure. With the clockwise rotation of the opening member 3, the two-stage protuberance 3b is rotated about the shaft 3a to push the cam arm 12c of the interlock lever 12, causing clockwise rotation of the interlock lever 12 about the shaft 12a, whereby the operating protuberance 12d is brought into engagement with the bent portion 14b of the fulcrum lever 14 and causes the fulcrum lever 14 to rotate about the shaft 14a in the counterclockwise direction. With the operation of the fulcrum lever 14, the arm 14c thereof pushes the bent portion 6c of the closing pawl 6 to cause counterclockwise rotation thereof about the shaft 6a, thus releasing the engagement between the lower bent portion 6d and hook 5c of the closing member 5.

When the engagement of the hook 5c is released, the closing member 5 is rotated by a spring (not shown) about the shaft 5a in the clockwise direction to operate shutter blade means (not shown), thus closing the opening 1a to bring an end to the exposure.

In the last stage of rotation of the closing member 3, the two-stage protuberance 3b is brought into engagement with the arm 15a of the engagement pawl 15, causing counterclockwise rotation of the engagement pawl 15 about the shaft 7a to release the engagement of the operating arm 25d of the control lever 25 with the engagement bent portion 15b.

When the engagement of the operating arm 25d is released, the control lever 25 is rotated by the spring 25a about the shaft 24a in the clockwise direction. At this time, free operation without restraint is obtained since the pin 16b of the first gear 16 is retreated from the operative region of the operating arm 25d, so that the lower bent portion 25e is brought into engagement with the bent portion 6d of the closing pawl 6. However, since the closing pawl 6 has already been operated by the interlock lever 12, the closing pawl 6 is pushed after the operation of the closing member 5. Thereafter, the bent portion 25b is brought into engagement with one side of the channel-shaped protuberance of the control base plate 11, whereupon the control lever 25 is stopped.

After the engagement pawl 15 is operated by the two-stage protuberance 3b, the bent portion 3c of the opening member 3 is locked by the hook 7e of the operating member 7, thus preventing backlash at the halt position.

After the shutter blade means is brought by the opening member 3 to an opening stop position, the operating arm 25d is released from engagement with the bent portion 15b of the engagement pawl 15. As the engagement bent portion 15b escapes from the operating arm 25d, the control lever 25 applys reaction force to the bent portion 15b, thus causing further counterclockwise rotation of the engagement pawl 15 about the shaft 7a.

As a result, the contact arm 15a of the engagement pawl 15 is brought into contact with an insulated contact piece (not shown) to cause conduction of a terminal connected to a flash means. After conduction of the terminal of the flash means is brought about by the contact arm 15c, clockwise rotation of the engagement pawl 15 is caused by a spring (not shown), whereby the arm 15a is brought into contact with the two-stage protuberance 3b and is stopped after breaking contact with the afore-mentioned contact piece.

To charge the shutter again, the charge protuberance 7f of the operating member 7 is rotated in the clockwise direction about the shaft 7a, and while oscillating the zigzag wheel 8 and ankle 9 with the gear portion 7h, the two-stage protuberance 3b of the opening member 3 is pushed with the cam portion 7c causing counterclockwise rotation of the opening member 3 about the shaft 3a to bring the shutter blade means (not shown) to the charge position while also charging a spring (not shown).

Simultaneously with the counterclockwise rotation of the opening member 3, the cam portion 3e pushes the upper protuberance 5b of the closing member 5 to cause counterclockwise rotation thereof about the shaft 5a, thus bringing the shutter blade means (not shown) to the charge position while also charging a spring (not shown).

While the clockwise rotation of the operating member 7, a spring (not shown) for the operating member is charged, while at the same time, the bent portion 25c of the control lever 25 is pushed by the upwardly projecting pin 7d, whereby the control lever 25 charges the spring 25a while also the operating arm 25d is rotated in the counterclockwise direction to a position of engagement with the engagement bent portion 15 of the engagement pawl 15.

At the same time, the urging portion 24c of the switching member 24 is pushed by the pin 7d, causing counterclockwise rotation of the member 24 to separate the engagement arm 24d from the stepped portion 29a of the restraining lever 29.

When the charge position is reached by the operating member 7, the engagement bent portion 7b is engaged by the hook 10b of the release lever 10, the bent portion 3d of the opening member 3 is engaged by the hook 4 of the opening pawl 4, and further the hook 5c of the closing member 5 is engaged by the bent portion 6b of the closing pawl 6, so that the state of FIGS. 1 and 2 is obtained.

In the above operation, the fulcrum lever 14 is supported at its most leftward position so that the exposure period is controlled to the shortest period (for instance 1/1,000 second). By subsequently operating the exposure period select dial of the camera to cause counterclockwise rotation of the cam plates 30a, 30b and 30c about the shaft 11d, the upper protuberance 13b of the adjustment lever 13 is caused by the cam plate 30a to be displaced in the rightward direction by the spring stretched by the spring hook bent portion 3d, thus pushing the fulcrum lever 14 in the rightward direction from the state of FIG. 1.

As the fulcrum lever 14 is pushed in the rightward direction, the bent portion 14b and arm 14c of the lever 14 act to change the relative operative phases of the operating protuberance 12d of the interlock lever 12 and bent portion 6c of the closing pawl 6, whereby the two-stage protuberance 3b of the opening member 3 operates, in a further rotated position, the closing pawl 6 via the interlock lever 12 and fulcrum lever 14, that is, the exposure period is controlled to progressively longer periods (for instance, 1/500 sec., 1/250 sec., etc.). At this time, the cam plates 30b and 30c hold the restraining lever 29 and converting lever 27 in the respective inoperative positions with respect to the respective switching member 24 and operating lever 26 in the manner as described above.

With further counterclockwise rotation of the cam plates 30a, 30b and 30c, the fulcrum lever 14 reaches a position at which the closing pawl 6 is not operated even with the rotation of the interlock lever 12.

At this time, the closing pawl 6 has no influence upon the interlock lever 12, and when the shutter blade means is displaced by the opening member 3 to the open position in the opening 1a, the two-stage protuberance 3b causes counterclockwise rotation of the engagement pawl 15 about the shaft 7a to release engagement of the operating arm 25b by the engagement bent portion 15b, thus causing clockwise rotation of the control lever 25 about the shaft 24a to cause the bent portion 6d of the closing pawl 6 to be pushed in the rightward direction by the lower bent portion 25e so as to release the closing member 5 for bringing an end to the exposure. The exposure period at this time is further extended by another step, for instance 1.125 sec.

With further counterclockwise rotation of the cam plate 30a, 30b and 30c, the cam plates 30a comes to hold the fulcrum lever 14 at a position corresponding to 1/125 second, the cam plate 30b comes to hold the stepped portion 29a of the restraining lever 29 at a position out of mesh with the first and second ankles 20 and 21, and the cam plate 30c causes the converting lever 27 to be moved in the clockwise direction by the spring biasing the spring hook bent portion 27c as it is followed by the convex portion of the two-stage bent portion 27b, thus releasing the restrainment of the operating arm 26a by the protuberance 27a, whereby the operating lever 26 is rotated about the shaft 24a in the counterclockwise direction as it is urged by the pin 16b biased by the spring 16c of the first gear 16.

The position of the first gear pin 16b is also regulated in correspondence to the cam plate 30c, and upon shutter release, the rotation of the operating arm 25d of the control lever 25 is controlled to control the exposure period to, for instance, 1/60 second.

When the cam plates 30a, 30b and 30c are further rotated in the counterclockwise direction, the cam 30b causes counterclockwise rotation of the stepped portion 29b of the restraning lever 29 to a position corresponding to the engagement arm 24d of the switching member 24 without movement of the adjustment lever 13 and fulcrum lever 14. If the shutter is released in this state, clockwise rotation of the opening member 3 is caused to start an exposure. When the control lever 25 is released in the last stage of this operation, the operating arm 25d comes to engage the pin 16b of the first gear 16 and thereby control the rotation. However, since the switching member 24 follows the pin 7d of the operating member 7 and executes clockwise rotation up to a position at which the engagement arm 24d is engaged by the stepped portion 29b of the restraining lever 29, the cam portion 23d is released from the shaft 21a, whereby the ankle lift lever 23 is rotated by the spring 23c about the pillar 22b in the counterclockwise direction, with the first ankle 20 in mesh with the gear 18a. The exposure period at this time corresponds to a period at which the position of the pin 16b of the first gear 16 is regulated in correspondence to the cam plate 30c; for instance the control lever 25 is controlled for controlling the exposure period to 1/30 sec., 1/15 sec., 1/8 sec., etc., and with operation of the closing pawl 6 caused by the bent portion 25e, an end is brought to the exposure.

With still further counterclockwise rotation of the cam plates 30a, 30b and 30c, the cam plate 30b causes counterclockwise rotation of the restraining lever 29 about the shaft 28c to a position at which its stepped portions 29a and 29b are out of engagement with the engagement arm 24d without movement of the adjustment lever 13 and fulcrum lever 14.

When the shutter is released in this state, counterclockwise rotation of the operating member 7 is caused and followed by the pin 7d, causing rotation of the urging portion 24c of the switching member 24 to cause rotation of the first and second ankles 20 and 21 to respective positions in mesh with the respectively associated gear 18 and zigzag gear 19a and also rotation of the ankle lift lever 23 and switching member 24 by the spring 23c. With further rotation of the operating member 7 to release the opening member 5 and operate the engagement pawl 15 in the last stage of operation of the opening member 3 so as to release the control lever 25, the operating arm 25d is brought into engagement with the pin 16b thereby causing rotation of the gear train and oscillation of the first and second ankles, whereby the position of the pin 16b is regulated by the converting lever 27 corresponding to the cam plate 30c and the operating lever 26. Thus, the control lever 25 is controlled to control the exposure period to, for instance 1/4 sec., 1/2 sec., 1 sec., etc., and with operation of the closing pawl 6 caused by the bent portion 25e, the closing member 5 is released to bring an end to the exposure.

In order for the exposure to be effected during the depressed state of the camera release button and for the bulb operation of closing the shutter to be effected by releasing the button, the cam plates 30a, 30b and 30c are further rotated in the counterclockwise direction, so that the cam plate 30a permits movement of the upper protuberance 13b, causing further rightward movement of the fulcrum lever 14. Thus, since the operating protuberance 12d and bent portion 6c are held independently of each other and the lower bent portion 13c of the adjustment lever 13 escapes from the stepped portion 28b of the bulb lever 28 and is moved in the rightward direction, the bulb lever 28 is rotated in the counterclockwise direction about the shaft 28c by a spring (not shown) to follow and be brought into contact with the release button of the camera (not shown). Also, the cam plates 30b and 30c hold the respective restraining lever 29 and converting lever 27 in the respective state of not engaging the engagement arm 24d and not operating the operating arm 26a.

When the camera release button is depressed in this state, the bulb lever 28, following this, is rotated in the counterclockwise direction, whereby the lower bent portion 28a is introduced into the operative region of the bent portion 26b of the operating lever 26. When the release button is further depressed to cause clockwise rotation of the release lever 10, counterclockwise rotation of the operating member 7 is caused and followed by the switching member 24, causing the displacement of the first and second ankles 20 and 21 to the respective operative positions and release of the opening member 3 to start an exposure. When the control lever 25 is subsequently released and as the operating arm 25d is depressed by the pin 16b, the control lever 25 is rotated in the clockwise direction. When the pin 16b engages the protuberance 26e of the operating lever 26, it locks the control lever 25 in that position since the bent portion 26b is engaged by the bent portion 28a of the bulb lever 28. By releasing the release button, the bulb lever 28 is rotated in the clockwise direction against a spring (not shown) to release the engagement between the lower bent portion 28a and bent portion 26b, whereby clockwise rotation of the operating lever 26 is caused by the operating arm 25d of the control lever 25 as the urging protuberance 26e is urged by the spring 25a via the pin 16b. At this time, the bent portion 6d of the closing pawl 6 is pushed by the bent portion 25e of the control lever 25, whereby the engagement of the closing member 5 is released by the bent portion 6b to bring an end to the exposure.

It is possible to arrange the parts such that during the above operation of the bulb lever 28, the cam plate 30b causes the restraining lever 29 to bring the stepped portion 29b and engagement arm 24d into engagement with each other so that only the first ankle is oscillated.

Also, while in the above embodiment the first ankle 20 and second ankle 21 are adapted to be engaged and disengaged, it is also possible to have an arrangement such that part of the gear train is separated for engagement or disengagement or such that part of the gear train is swtiched to change the rotation ratio for engagement and disengagement of some gears, and no limitation is imposed upon the member which is engaged and disengaged.

As has been made apparent from the foregoing, with the control means according to the invention, at the time of short exposure period control, the opening member 3 is released to operate the closing pawl 6 so as to release the closing member 5 so that the operational phases of the two are controlled in direct relation to the mutal interval between the shutter blade means. Thus, it is possible to obtain accurate control without phase conversion even in case of a very short exposure period (for instance 1/2,000 second).

In addition, at the time of control of a long exposure period, the control lever 25 which is adapted to be released by the opening member 3 is controlled by a delaying means for controlling the release timing of the closing member 5. The closing member 5 does not require the operative region of the delaying means at all but it can be operated in a region corresponding to a minimum region of operation of the shutter blade means which occupies a comparatively large area in this type of shutter, so that it is possible to obtain a shutter of reduced size.

More particularly, the closing member 3 is released after a period of time which is required for stabilizing the replaceable lens side iris of a single lens reflex camera, or the time period required for flashing of a flash bulb of a comparatively long delay period is ensured during the movement of the operating member after the shutter release; this means that the shutter is opened after a desired preparatory operative time period has been ensured. Thus, the operating member 7 can effect the desired operation with a minimum stroke.

As has been mentioned, by constructing the shutter control means with the first control system including the two-stage pin 3b of the opening member 3 and the fulcrum member 14 and the second control system including the engagement pawl 15, the control lever 25 and the gear train, it is possible to reduce the shutter charge stroke and also reduce the shutter size.

In other words, since the short exposure period is controlled by the first control system, the charge stroke of the operating member 7 can be reduced compared to the prior art way of control by the operating member 7.

In addition, since the long exposure period is controlled by the second control system, the control lever 25 is controlled within the charge stroke of the operating member 7 and the delaying means is operated separately of the operation of the shutter blade means, so that the operating stroke of the shutter blade means can be reduced compared to the prior-art screen shutter.

Further, as can be appreciated from the foregoing, the switching member 24 which is clad with an ankle or part of gear train adapted to be detached from the engagement position and displaced to an inoperative state with the shutter charge, is selectively engaged by the restraining lever 29 adapted to be displaced by a cam plate operated in relation to the shutter dial, and the ankle or part of the gear train is controlled to either its operative position or inoperative position in correspondence to the shutter dial. Thus, since a number such as the restraining member having a small stroke compared to the case of directly operating the exposure period converting member such as by operation of a cam plate, the size of the switching means can be reduced, and also light and smooth operation of the exposure period converting member can be obtained compared to the prior art case of directly operating the switching member.

What is claimed is:

1. A camera shutter control mechanism for controlling a shutter opening comprising: an opening member movable in an opening direction for opening the shutter opening to start an exposure; a closing member movable in a closing direction for closing the shutter opening to terminate the exposure; an opening pawl for releasably locking said opening member in a charged position in readiness for movement in said opening direction; a closing pawl for releasably locking said closing member in a charged position in readiness for movement in said closing direction; an operating member for operating said opening pawl so as to release said opening member to undergo movement in said opening direction; an interlock lever arranged to be operated by said opening member during movement thereof in said opening direction; an adjustable fulcrum lever operable when in an operative position to be driven by said interlock lever for operating said closing pawl so as to release said closing member to undergo movement in said closing direction; means for adjusting the operative phase of said fulcrum lever with respect to said closing pawl within a range of operative positions corresponding to a range of exposure periods and for selectively effecting movement of said fulcrum lever to an inoperative position; a control lever operable when said fulcrum lever is in said inoperative position for operating said closing pawl so as to release said closing member to undergo movement in said closing direction; and an engagement pawl for releasably engaging with said control lever to lock said control lever in a charged position and arranged so as to disengage from said control lever upon movement of said opening member in said opening direction.

2. A mechanism as claimed in claim 1; further including exposure time switching means for switching between different exposure times, said switching means comprising a switch operating member operable prior to the start of an exposure, delay means including a gear train for controlling the exposure period, and a switching member removably carrying at least part of said delay means in an inoperative position when said switch operating member is in a charged position.

3. A mechanism as claimed in claim 2; wherein said switching means includes a change-over spring for energising said switching member to an operative position where said part of said delay means is operative, and a restraining lever having a holding position for holding said switching member in the inoperative position and a release position in which said switching member is operative.

4. A mechanism as claimed in claim 3; further including an exposure period converting member operated by a shutter dial to move said switching member in a position in which it can be engaged by said restraining lever.

5. A camera shutter control mechanism for controlling a shutter opening comprising: an opening member movable in an opening direction for opening the shutter opening to start an exposure; a closing member movable in a closing direction for closing the shutter opening to terminate the exposure; an opening pawl for releasably locking said opening member in a charged position in readiness for movement in said opening direction; a closing pawl for releasably locking said closing member in a charged position in readiness for movement in said closing direction; an operating member for operating said opening pawl so as to release said opening member to undergo movement in said opening direction; a first system for actuating said closing pawl so as to release said closing member to undergo movement in said closing direction to control relatively short exposure periods, said first system comprising an adjustably positionable fulcrum lever positionable within a predetermined range of operating positions corresponding to a range of relatively short exposure periods and positionable outside said predetermined range and engageable with said closing pawl only when positioned within said predetermined range, and means operable during the course of movement of said opening member in said opening direction for effecting movement of said fulcrum lever to thereby actuate said closing pawl to release said closing member; and a second system for actuating said closing pawl so as to release said closing member to undergo movement in said closing direction to control relatively long exposure periods, said second system comprising a pivotable control lever pivotable in one direction to actuate said closing pawl to release said closing member, an engagement pawl for releasably engaging with said control lever to lock said control lever in a charged position, and means operable during the course of movement of said opening member in said opening direction whenever said fulcrum lever is positioned outside said predetermined range for disengaging said engagement pawl from said control lever thereby releasing said control lever to pivot in said one direction to actuate said closing pawl.

6. A mechanism as claimed in claim 5; wherein said second system includes delay means for controlling the relatively long exposure periods.

7. A mechanism as claimed in claim 5; wherein said first system includes means mounting said fulcrum lever for sliding movement within said predetermined range of operating positions to selectively adjust the operative phase of said fulcrum lever with respect to said closing pawl and for sliding movement outside said range and for pivotal movement to actuate said closing pawl.

* * * * *